(12) United States Patent
Gu et al.

(10) Patent No.: US 11,782,541 B2
(45) Date of Patent: Oct. 10, 2023

(54) TOUCH PANEL AND DISPLAY DEVICE

(71) Applicant: BOE TECHNOLOGY GROUP CO., LTD., Beijing (CN)

(72) Inventors: Penghao Gu, Beijing (CN); Hong Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 353 days.

(21) Appl. No.: 17/051,239

(22) PCT Filed: Apr. 26, 2020

(86) PCT No.: PCT/CN2020/087037
§ 371 (c)(1),
(2) Date: Oct. 28, 2020

(87) PCT Pub. No.: WO2020/253384
PCT Pub. Date: Dec. 24, 2020

(65) Prior Publication Data
US 2022/0291768 A1   Sep. 15, 2022

(30) Foreign Application Priority Data
Jun. 21, 2019  (CN) .......................... 201910541869.X

(51) Int. Cl.
*G06F 3/041*         (2006.01)
(52) U.S. Cl.
CPC .......... *G06F 3/0412* (2013.01); *G06F 3/0414* (2013.01); *G06F 2203/04102* (2013.01)
(58) Field of Classification Search
None
See application file for complete search history.

(56) References Cited

U.S. PATENT DOCUMENTS

| 9,965,092 | B2  | 5/2018 | Smith |
|-----------|-----|--------|-------|
| 2015/0103030 | A1* | 4/2015 | Jang ...................... G06F 3/0445 345/173 |

(Continued)

FOREIGN PATENT DOCUMENTS

| CN | 102609139 A | 7/2012 |
| CN | 102822779 A | 12/2012 |

(Continued)

OTHER PUBLICATIONS

International Search Report and Written Opinion for International Application No. PCT/CN2020/087037 dated Jul. 27, 2020.

(Continued)

*Primary Examiner* — Brian M Butcher
(74) *Attorney, Agent, or Firm* — XSENSUS LLP

(57) ABSTRACT

A touch panel may include a back layer, a supporting layer, a conductive layer, an electrode layer, and a frame sealant. The back layer is formed at a back side of a display screen; the supporting layer is arranged opposite to the back layer and is located at a side of the back layer facing away from the display screen; the conductive layer is located between the back layer and the supporting layer and is formed on the back layer; the electrode layer is located between the back layer and the supporting layer and formed on the supporting layer, with a gap between the electrode layer and the conductive layer; and the frame sealant couples the back layer with the supporting layer, and is arranged around the conductive layer and the electrode layer.

18 Claims, 3 Drawing Sheets

(56) References Cited

U.S. PATENT DOCUMENTS

2017/0090632 A1    3/2017   Su et al.
2017/0336902 A1   11/2017   Smith

FOREIGN PATENT DOCUMENTS

| | | |
|---|---|---|
| CN | 105117072 A | 12/2015 |
| CN | 105717689 A | 6/2016 |
| CN | 205540652 U | 8/2016 |
| CN | 107092397 A | 8/2017 |
| CN | 207718344 U | 8/2018 |
| CN | 109669562 A | 4/2019 |
| CN | 109727532 A | 5/2019 |
| CN | 110286790 A | 9/2019 |
| CN | 110297567 A | 10/2019 |
| EP | 3147947 A1 | 3/2017 |
| WO | 2019085671 A1 | 5/2019 |

OTHER PUBLICATIONS

First Office Action for CN Patent Application No. 201910541869.X dated Mar. 19, 2021.

* cited by examiner

TOUCH PANEL AND DISPLAY DEVICE

CROSS-REFERENCE TO RELATED APPLICATIONS

The present application is a 35 U.S.C. § 371 national phase application based upon International Application No. PCT/CN2020/087037 filed on Apr. 26, 2020, which claims priority to Chinese Patent Application No. 201910541869.X, titled "TOUCH PANEL AND DISPLAY DEVICE" filed on Jun. 21, 2019, the entire contents of which are incorporated herein by reference.

TECHNICAL FIELD

The present disclosure relates to the field of display technology and, in particular, to a touch panel and display device.

BACKGROUND

An organic light emitting display (OLED) has gradually become the first choice for a screen. The OLED has many advantages such as self-luminescence, high luminous efficiency, short response time, high definition and contrast, and can also ensure that the screen has a certain degree of flexibility and adaptability. With the development of flexible display screens, people have higher and higher expectations for multifunctional display products.

A 3D touch (i.e., three-dimensional touch) technology (so-called pressure sensing technology) is a technology applied to the screen, which can sense a pressing force of a user's touch operation, and generate different electrical signals according to different pressing forces, thereby triggering different operations to provide a better user experience.

At present, a touch panel is generally arranged at a display side of the display screen, which however would affect the transmittance of light and thus a display effect thereof. In addition, the current touch panel is prone to incur peeling and thus has a poor structural stability.

It should be noted that the information disclosed in the above background section is only used for strengthening the understanding of the background of the present disclosure, and therefore may include information that does not constitute the prior art known to those skilled in the art.

SUMMARY

The present disclose provides a touch panel and display device.

A first aspect of the present disclosure provides a touch panel, including:
  a back layer formed at a back side of a display screen;
  a supporting layer arranged opposite to the back layer and located at a side of the back layer away from the display screen;
  a conductive layer located between the back layer and the supporting layer and on the back layer;
  an electrode layer located between the back layer and the supporting layer and on the supporting layer, with a gap between the electrode layer and the conductive layer; and
  a frame sealant coupling the back layer and the supporting layer, and arranged around the conductive layer and the electrode layer.

In an exemplary embodiment of the present disclosure, the touch panel has a bending region, and a region of the frame sealant corresponding to the bending region is provided with a through hole.

In an exemplary embodiment of the present disclosure, the frame sealant includes a top surface and a bottom surface opposite to each other, the top surface is adhered to the back layer, and the bottom surface is adhered to the supporting layer; and the through hole penetrates through the top surface and the bottom surface.

In an exemplary embodiment of the present disclosure, the touch panel has a bending region, and a region of the frame sealant corresponding to the bending region is provided with a groove.

In an exemplary embodiment of the present disclosure, the gap between the electrode layer and the conductive layer is 1 μm to 5 μm.

In an exemplary embodiment of the present disclosure, side surfaces of the conductive layer and the electrode layer are in contact with an inner side surface of the frame sealant.

In an exemplary embodiment of the present disclosure, the back layer is made of a high molecular material, and the conductive layer is made of a conductive polymer material.

In an exemplary embodiment of the present disclosure, the conductive layer is formed on the back layer through a coating method.

In an exemplary embodiment of the present disclosure, the supporting layer is made of a metal material or a high molecular material, and the electrode layer is a flexible circuit board.

In an exemplary embodiment of the present disclosure, the electrode layer is adhered to the supporting layer through an adhesive layer.

A second aspect of the present disclosure provides a display device, including a display screen and any one of the above touch panels.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show embodiments conforming to the present disclosure, and serve to, together with the specification, explain the principle of the present disclosure. Understandably, the drawings in the following description are only some embodiments of the present disclosure. For those skilled in the art, other drawings may be obtained on the basis of these drawings without creative work.

DETAILED DESCRIPTION

Figure 1:
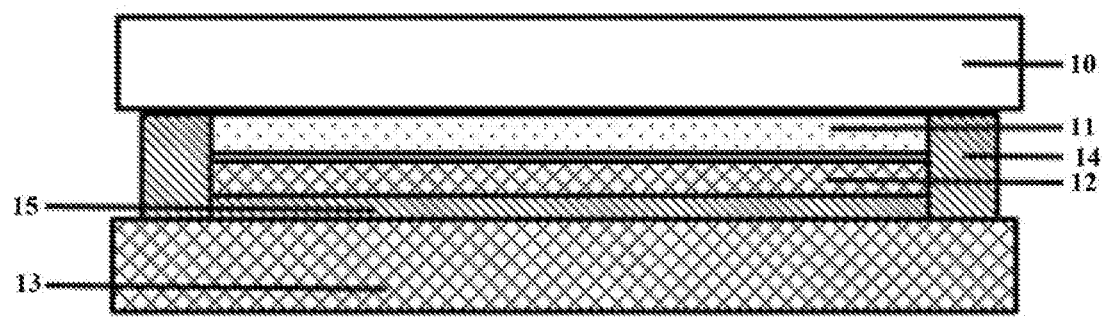
FIG. 1 shows a schematic diagram of a touch panel according to an embodiment of the present disclosure.

Exemplary embodiments will now be described more fully with reference to the accompanying drawings. However, the exemplary embodiments may be implemented in various forms, and should not be construed as being limited to the embodiments set forth herein; on the contrary, these embodiments are provided so that the present disclosure will be comprehensive and complete, and the concept of the exemplary embodiments is fully conveyed to those skilled in the art. The same reference numerals in the figures represent the same or similar structures, and thus their detailed descriptions will be omitted.

Although relative terms such as "on" and "under" are used in the specification to describe the relative relationship between one component and another component shown in the drawings, these terms are used in the specification only for the convenience of description, for example, according to the example direction shown in the accompanying drawings. It can be understood that if the shown device is turned upside down, a component described as "on" will become a component described as "under". When a structure is "on" another structure, it may mean that the structure is integrally formed on another structure, or that the structure is "directly" arranged on another structure, or that the structure is "indirectly" arranged on another structure with a further structure therebetween.

The terms "a", "an", "the" and "said" are used to indicate that there is one or more elements/components/etc. The terms "include" and "have" are used to indicate open-ended inclusion, and means that there may be other elements/components/etc. in addition to listed elements/components/etc. The terms "first", "second" and the like are only used as marks, without limiting the numbers of objects.

At present, there are many 3D touch implementing technologies, such as resistive touch, inductive touch, pressure-sensitive touch, and the like. Compared with the resistive touch and the inductive touch, the pressure-sensitive touch has a cost advantage and further provides a multi-touch function, and thus is widely used.

Figure 7:
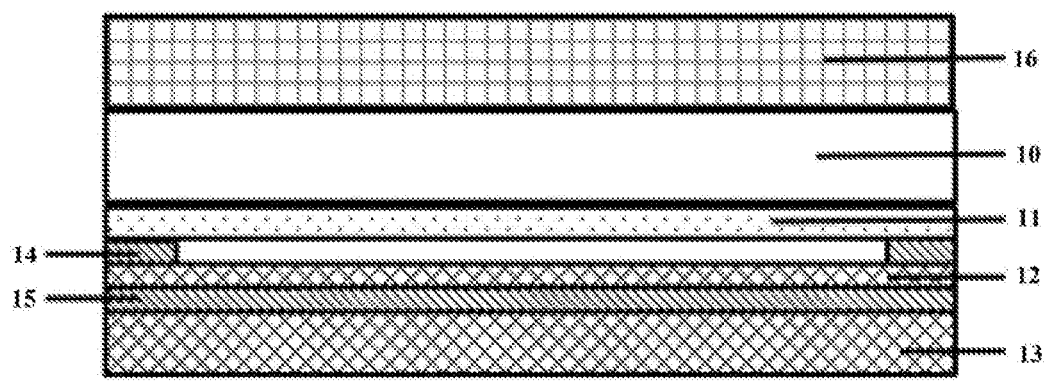
FIG. 7 shows a schematic diagram of a display device according to an embodiment of the present disclosure.

The inventor proposes a touch panel using the principle of pressure-sensitive touch. As shown in FIG. 7, the touch panel may be formed on a back side of a display screen 16 to avoid influence of the touch panel on light transmittance, which may improve a display effect of a display device. The touch panel may include a back layer 10 and a supporting layer 13 opposite to each other, a conductive layer 11 and an electrode layer 12 between the back layer 10 and the supporting layer 13, and a frame sealant 14 coupling the conductive layer 11 and the electrode layer 12. It should be noted that the back layer 10 can be not only a part of the touch panel, but also a part of the display screen 16. That is, the touch panel and the display screen 16 may share the back layer 10 to reduce a thickness of the display device. The conductive layer 11 may be formed on the back layer 10, and the electrode layer 12 may be formed on the supporting layer 13 through an adhesive layer 15. There is a gap between the conductive layer 11 and the supporting layer 13, that is, a contact space is formed between the conductive layer 11 and the electrode layer 12. After being applied with a pressure, the conductive layer 11 may contact the electrode layer 12 to generate electrical signals, so that a touch position can be determined. In addition, the conductive layer 11 can generate different electrical signals under different pressures, thereby achieving different touch functions.

However, since there are usually pressure-sensitive particles in the conductive layer 11, and the electrode layer 12 is usually of a mesh shape, both surfaces of the conductive layer 11 and the electrode layer 12 are extremely rough. When the frame sealant 14 is used to couple the conductive layer 11 and the electrode layer 12, an adhesive force of the frame sealant 14 cannot be guaranteed after being adhered, and thus the frame sealant 14 is easily peeled off from the conductive layer 11 and the electrode layer 12, resulting in poor structural stability of the touch panel. In addition, the frame sealant 14 has the risk of covering touch regions of the conductive layer 11 and the electrode layer 12, thereby easily affecting the touch function of the touch panel.

Therefore, in order to solve the above technical problem, the inventor also provides a touch panel, which can be formed on the back side of the display screen 16. As shown in FIG. 1, the touch panel may include a back layer 10, a conductive layer 11, a supporting layer 13, an electrode layer 12 and a frame sealant 14.

The back layer 10 may be formed on a back side of the display screen 16. The back layer 10 may be made of a high molecular material, such as PET (polyethylene terephthalate) material and PI (polyimide) material. It shall be noted that surfaces of the back layer 10 are usually flat with low roughness.

The supporting layer 13 is disposed opposite to the back layer 10 and is located at a side of the back layer 10 away from the display screen 16. The supporting layer 13 may be made of a metal material (for example, stainless steel) or a high molecular material (for example, PET). It shall be noted that surfaces of the supporting layer 13 are usually flat with low roughness.

The conductive layer 11 is located between the back layer 10 and the supporting layer 13 and is formed on the back layer 10. The conductive layer 11 may be made of a conductive polymer material. It should be understood that the conductive polymer material therein usually has pressure-sensitive particles, so the surfaces of the conductive layer 11 made of the conductive polymer material are relatively rough. A surface roughness of the conductive layer 11 is higher than that of the back layer 10 and the supporting layer 13. For example, the conductive layer 11 may be formed on the back layer 10 by a coating method, that is, the conductive polymer material may be coated on the side of the back layer 10 away from the display screen 16 by the coating method to form the conductive layer 11. However, the present disclosure is not limited thereto, and the conductive layer 11 may be formed on the back layer 10 by any connecting method, for example, the conductive layer 11 may also be formed on the back layer 10 by an adhering or pressing method.

The electrode layer 12 is located between the back layer 10 and the supporting layer 13 and is formed on the supporting layer 13. There is a gap between the electrode layer 12 and the conductive layer 11, and the gap may be in the range of 1 μm to 5 μm, which can improve touch sensitivity. The electrode layer 12 may be a flexible printed circuit (FPC) board. The flexible printed circuit board is a printed circuit board (PCB) made of polyimide or polyester film and with high reliability and excellent flexibility, and has characteristics such as high wiring density, light weight, thin thickness, and good bendability. It should be understood that since wires in a flexible circuit board are usually protrudingly arranged on a substrate, in an embodiment, the surface of the electrode layer 12 is relatively rough, and the surface roughness of the electrode layer 12 is higher than that of the back layer 10 and the supporting layer 13. The wires in the flexible circuit board may be of a mesh shape, however the present disclosure is not limited thereto.

For example, the electrode layer 12 may be adhered to the supporting layer 13 through an adhesive layer 15. The adhesive layer 15 may be of acrylic adhesive; however, the present disclosure is not limited thereto. In addition, the electrode layer 12 can not only be formed on the supporting layer 13 by an adhering method, but also can be formed on the supporting layer 13 by any connecting method. For example, the electrode layer 12 can also be formed on the supporting layer 13 by a coating or pressing method.

The frame sealant 14 can couple the back layer 10 with the supporting layer 13 and is arranged around the conductive layer 11 and the electrode layer 12. It can be seen from the foregoing that the surface roughness of the back layer 10 and the supporting layer 13 is generally lower than that of the conductive layer 11 and the electrode layer 12. Therefore in the embodiment, the frame sealant 14 is used to couple the back layer 10 and the supporting layer 13. Compared with a scheme of using the frame sealant 14 to couple the conductive layer 11 and the electrode layer 12, the adhering stability of the frame sealant 14 can be ensured, that is, there is a relatively strong adhesive force between the frame sealant 14 and the back layer 10 and the supporting layer 13, and the adhesive force may be about 2000 gf/Inch, which can alleviate the peeling of the touch panel and improve the structural stability of the touch panel. In addition, since the frame sealant 14 is arranged around the conductive layer 11 and the electrode layer 12, the risk of the frame sealant 14 covering the touch region of the conductive layer 11 and the electrode layer 12 can be avoided, thereby improving the touch function of the touch panel.

In addition, the frame sealant 14 may be implemented to couple the back layer 10 and the supporting layer 13 by expanding the back layer 10 and the supporting layer 13. That is, the back layer 10 and the supporting layer 13 may be designed to be expanded outward, in other words, the areas of the back layer 10 and the supporting layer 13 are increased, and the expanded part is the part coupled with the frame sealant 14. Alternatively, the frame sealant 14 may be implemented to couple the back layer 10 and the supporting layer 13 by shrinking the conductive layer 11 and the electrode layer 12 inward. That is, the conductive layer 11 and the electrode layer 12 are designed to be shrunk inward, in other words, the areas of the conductive layer 11 and the electrode layer 12 are reduced. The exposed parts of the back layer 10 and the supporting layer 13 due to the inward shrinkage of the conductive layer 11 and the electrode layer 12 are the parts coupled with the frame sealant 14.

It should be understood that while ensuring the coupling stability between the frame sealant 14 and the backing film layer 10 and the supporting layer 13, the size of the frame sealant 14 may be minimized as much as possible to further increase the areas of the conductive layer 11 and the electrode layer 12, so that it can ensure the touch area and improve the touch function of the touch panel.

An inner side surface of the frame sealant 14 can be in contact with the side surfaces of the conductive layer 11 and the electrode layer 12, so that a space can be fully utilized to increase the areas of the conductive layer 11 and the electrode layer 12, thereby ensuring the touch area.

Figure 2:
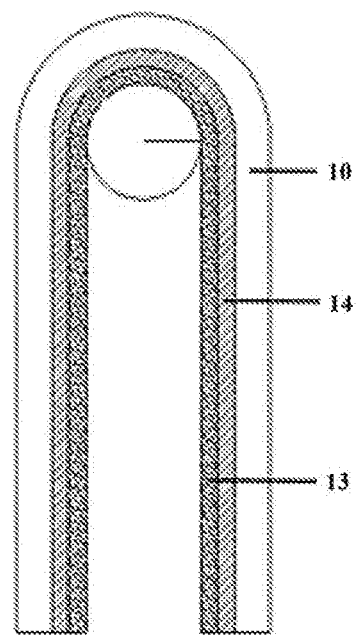
FIG. 2 shows a schematic diagram of a part structure of a touch panel having a back layer, a frame sealant and a supporting layer in a bent state according to an embodiment of the present disclosure.
Figure 3:
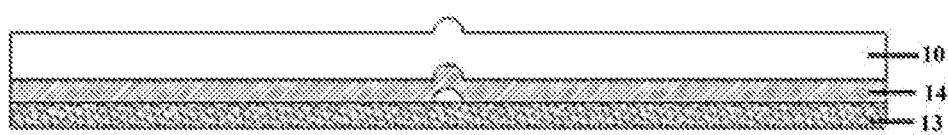
FIG. 3 shows a schematic diagram of the structure shown in FIG. 2 after being unbent.

The touch panel in the embodiment may have certain flexibility. As shown in FIG. 2, the touch panel can be bent, that is, the touch panel may have a bending region. However, since the frame sealant 14 is stretched during being bent, it is flattened and retracted. That is, the frame sealant 14 is in a process of being stretched and retracted, and then stretched and retracted. In this process, an accumulated deformation will be generated. Since both sides of the frame sealant 14 will be subjected to rigid constraints, the frame sealant 14 will be extruded. As shown in FIG. 3, the frame sealant 14 will generate protrusions/bubbles in the bending region under opposite effects of restraining extrusion and own stretching deformation, which causes the frame sealant 14 to easily peel off from the back layer 10 and the supporting layer 13 in the bending area. Therefore, in order to avoid the peeling of the frame sealant 14 from the back layer 10 and the supporting layer 13 under the complicated stress, the region of the frame sealant 14 corresponding to the bending region may be patterned, so that the region of the frame sealant 14 corresponding to the bending region is provided with an expandable and retractable space.

For example, a through hole 140 may be opened in the region of the frame sealant 14 corresponding to the bending area. The through hole 140 may be used as the expandable and retractable space, so that the frame sealant 14 can be freely deformed when it is bent and deformed without peeling from the back layer 10 or the supporting layer 13.

Figure 6:
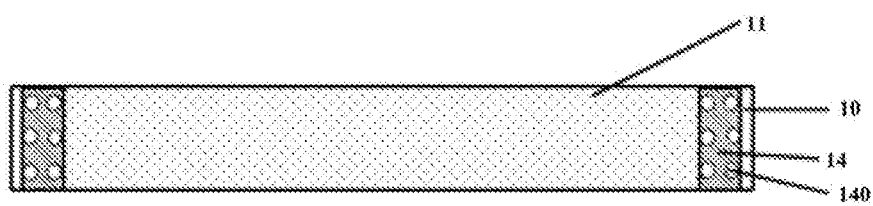
FIG. 6 shows a schematic diagram of a part structure of a touch panel at a bending area according to another embodiment of the present disclosure.

In detail, the frame sealant 14 may include opposite top and bottom surfaces, the top surface is adhered to the back layer 10, and the bottom surface is adhered to the supporting layer 13. As shown in FIG. 6, the through hole 140 penetrates through the top surface and the bottom surface. Alternatively, the frame sealant 14 may include opposite inner and outer side surfaces, the inner side surface is the surface of the frame sealant 14 facing the conductive layer 11 and the electrode layer 12, and the outer side surface may be surface of the frame sealant 14 facing away from the conductive layer 11 and the electrode layer 12. The through hole 140 penetrates through the outer side surface and the inner side surface.

It should be noted that the through hole 140 is not limited to a circular hole, and may also be an elliptical hole, a square hole, a diamond hole, or other irregular-shaped holes.

Figure 4:
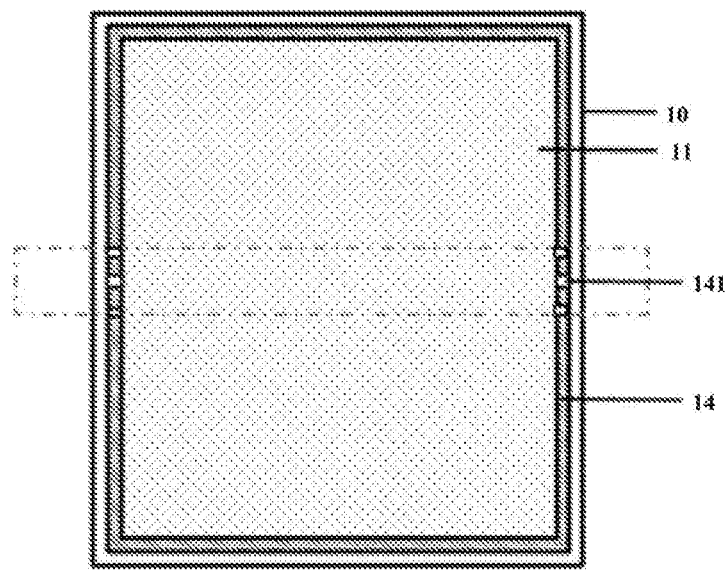
FIG. 4 shows a schematic diagram of a part structure of a touch panel according to another embodiment of the present disclosure.
Figure 5:
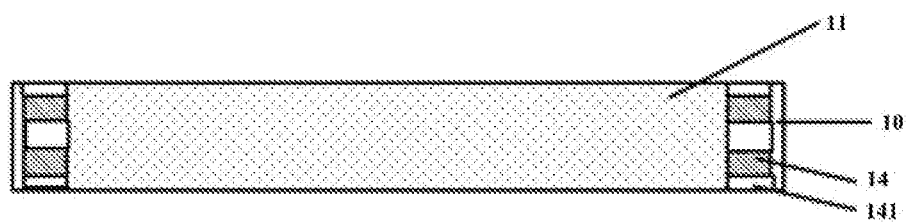
FIG. 5 shows a schematic diagram of a part structure of a touch panel at a bending region according to an embodiment of the present disclosure.

In addition, the patterning of the region of the frame sealant 14 corresponding to the bending region is not limited to the aforementioned solution of providing the through hole 140 in the frame sealant 14, and a groove 141 may also be opened in the region of the frame sealant 14 corresponding to the bending region, as shown in FIGS. 4 and 5. The groove 141 may be used as the expandable and retractable space, so that the frame sealant 14 can be freely deformed when being bent and deformed, without being peeled from the back layer 10 or the supporting layer 13. For example, the opening direction of the aforementioned groove 141 may face the back layer 10, may face the supporting layer 13, may also face the conductive layer 11 and the electrode layer 12, or be away from the conductive layer 11 and the electrode layer 12. And the opening shape of the groove may be circular, elliptical, square, diamond, or other irregular shapes.

It should be understood that the patterning of the frame sealant 14 is not only for the region corresponding to the bending area, but also for other regions than the bending region.

Figure 8:
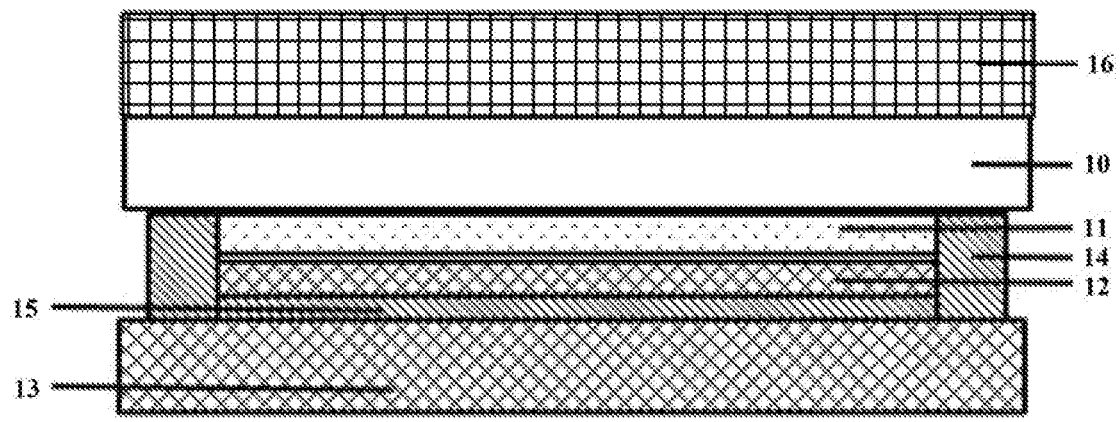
FIG. 8 shows a schematic diagram of a display device according to another embodiment of the present disclosure.

The present disclosure also provides a display device, which may be one of an e-reader, a mobile phone, a computer screen 16, a billboard, and a television. As shown in FIG. 8, the display device may include a display screen 16 and a touch panel. The display screen 16 may be a flexible screen, and the display screen 16 may include a driving backplane, an electronic light-emitting device, a film package, a polarizer, a cover plate, and the like, but is not limited thereto. The touch panel can be the touch panel described in any of the foregoing embodiments, and will not be described in detail here.

In the touch panel and the display device provided by the present disclosure, the touch panel can be formed on the back side of the display screen, so that the influence of the touch panel on the light transmittance can be avoided, and the display effect of the display device can be improved. In addition, in the present disclosure, the frame sealant is used to coupling the back layer with the supporting layer of the touch panel. The frame sealant can have a strong adhesive force with the back layer and the supporting layer, which can alleviate the peeling of the touch panel and improve the structural stability of the touch panel.

Those skilled in the art will easily conceive of other embodiments of the present disclosure after considering the specification and practicing the invention disclosed herein. The present disclosure is intended to cover any variations, uses, or adaptive changes of the present disclosure. These variations, uses, or adaptive changes follow the general principles of the present disclosure and include the common knowledge or conventional technical means in the technical field not disclosed in the present disclosure. The description and the embodiments are only regarded as exemplary, and the true scope and spirit of the present disclosure are pointed out by the appended claims.

What is claimed is:

1. A touch panel, comprising:
   a back layer located at a non-display side of a display screen;
   a supporting layer arranged opposite to the back layer and located at a side of the back layer away from the display screen;
   a conductive layer located between the back layer and the supporting layer and on the back layer;
   an electrode layer located between the back layer and the supporting layer and on the supporting layer, with a gap between the electrode layer and the conductive layer; and
   a frame sealant coupling the back layer and the supporting layer, and arranged around the conductive layer and the electrode layer,
   wherein the touch panel has a bending region, and a region of the frame sealant corresponding to the bending region is patterned to have an expandable and retractable space.

2. The touch panel according to claim 1, wherein the expandable and retractable space comprises a through hole opened in the region.

3. The touch panel according to claim 2, wherein the frame sealant comprises a top surface and a bottom surface opposite to each other, the top surface is adhered to the back layer, and the bottom surface is adhered to the supporting layer; and
   wherein the through hole penetrates through the top surface and the bottom surface.

4. The touch panel according to claim 1, wherein the expandable and retractable space comprises a groove opened in the region.

5. The touch panel according to claim 1, wherein the gap between the electrode layer and the conductive layer is 1 µm to 5 µm.

6. The touch panel according to claim 1, wherein side surfaces of the conductive layer and the electrode layer are in contact with an inner side surface of the frame sealant, and
   wherein the inner side surface is a surface of the frame sealant facing the conductive layer and the electrode layer.

7. The touch panel according to claim 1, wherein the back layer is made of a high molecular material, and the conductive layer is made of a conductive polymer material.

8. The touch panel according to claim 1, wherein a surface roughness of the conductive layer is greater than that of at least one of the back layer and the supporting layer.

9. The touch panel according to claim 1, wherein the supporting layer is made of a metal material or a high molecular material, and the electrode layer is a flexible circuit board.

10. The touch panel according to claim 9, wherein the electrode layer is adhered to the supporting layer through an adhesive layer.

11. The touch panel according to claim 1, wherein an area of at least one of the back layer and the supporting layer is larger than that of at least one of the conductive layer and the electrode layer.

12. The touch panel according to claim 1, wherein the back layer is provided between the touch panel and the display screen, so that the touch panel and the display screen share the back layer.

13. The touch panel according to claim 1, wherein the conductive layer comprises pressure-sensitive particles and has a mesh shape.

14. The touch panel according to claim 1, wherein an adhesive force between the frame sealant and at least one of the back layer and the supporting layer is greater than that between the frame sealant and at least one of the conductive layer and the electrode layer.

15. A display device comprising a display screen and a touch panel, wherein the touch panel comprises:
   a back layer located at a non-display side of the display screen;
   a supporting layer arranged opposite to the back layer and located at a side of the back layer away from the display screen;
   a conductive layer located between the back layer and the supporting layer and on the back layer;
   an electrode layer located between the back layer and the supporting layer and on the supporting layer, with a gap between the electrode layer and the conductive layer; and
   a frame sealant coupling the back layer and the supporting layer, and arranged around the conductive layer and the electrode layer,
   wherein the touch panel has a bending region, and a region of the frame sealant corresponding to the bending region is patterned to have an expandable and retractable space.

16. The display device according to claim 15, wherein the expandable and retractable space comprises a through hole opened in the region.

17. The display device according to claim 16, wherein the frame sealant comprises a top surface and a bottom surface opposite to each other, the top surface is adhered to the back layer, and the bottom surface is adhered to the supporting layer; and
   wherein the through hole penetrates through the top surface and the bottom surface.

18. The display device according to claim 15, wherein the expandable and retractable space comprises a groove opened in the region.

* * * * *